(12) United States Patent
Huang (10) Patent No.: US 7,665,340 B2
(45) Date of Patent: Feb. 23, 2010

(54) METHOD FOR MANUFACTURING ONE PIECE TURNBUCKLE

(76) Inventor: Han-Ching Huang, No. 12, Alley 111, Lane 437, Chen Hsing Road, Taichung (TW)

( * ) Notice: Subject to any disclaimer, the term of this patent is extended or adjusted under 35 U.S.C. 154(b) by 328 days.

(21) Appl. No.: 11/762,215

(22) Filed: Jun. 13, 2007

(65) Prior Publication Data

US 2008/0072649 A1    Mar. 27, 2008

(30) Foreign Application Priority Data

Sep. 26, 2006  (TW) .............................. 95135559 A (51) Int. Cl.
- *B21D 22/21* (2006.01)
- *B21D 28/00* (2006.01)
- *B21D 31/00* (2006.01)
- *B23P 13/00* (2006.01)

(52) U.S. Cl. .................. 72/348; 72/340; 72/379.2; 29/896.7

(58) Field of Classification Search ............. 29/896.7; 72/334, 340, 348, 356, 379.2

See application file for complete search history.

(56) References Cited

U.S. PATENT DOCUMENTS

| 935,660 | A | * | 10/1909 | Johnson | 29/896.7 |
| 1,413,821 | A | * | 4/1922 | Anderson | 29/896.7 |
| RE27,339 | E | * | 4/1972 | Dornbos | 29/896.7 |

FOREIGN PATENT DOCUMENTS

EP    0700748    12/1994

* cited by examiner

*Primary Examiner*—Dana Ross
*Assistant Examiner*—Teresa M Bonk
(74) *Attorney, Agent, or Firm*—Banger Shia (57) ABSTRACT

A method for manufacturing a one piece turnbuckle includes preparing a board of metal; deep drawing the board to form two protrusions and shaping the board into a form which has two opposite ends, with the opposite ends defined by the protrusions; deep drawing the board to reduce its thickness and to form a recess; punching the recess off so as to form a through opening; boring a hole through each of the protrusions; and tapping each hole to form a threaded section.

6 Claims, 16 Drawing Sheets

Fig. 16
PRIOR ART

METHOD FOR MANUFACTURING ONE PIECE TURNBUCKLE

BACKGROUND OF THE INVENTION

1. Field of the Invention

The present invention relates to a method of manufacture of a turnbuckle and, in particular, to an improved method for manufacturing a one piece turnbuckle.

2. Description of the Related Art

Figure 16:
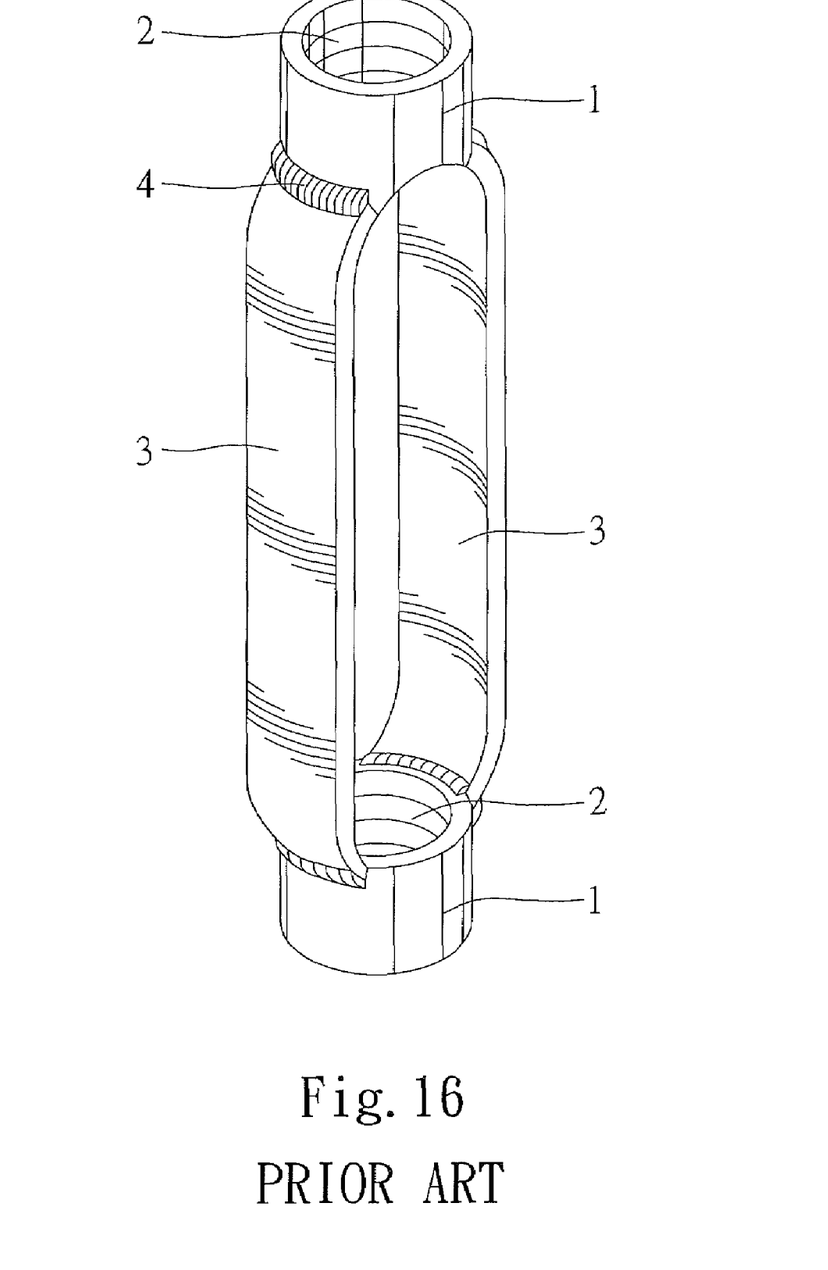
FIG. 16 is a perspective view of a conventional turnbuckle.

A conventional turnbuckle as appearing in FIG. 16 includes two cylindrical members 1 joined by two parallel bars 3 by welding at welding lines 4, with each of the cylindrical members 1 having a tapped portion 2 for engaging with bolts or with other structures which are intended to be retained by the turnbuckle. A drawback of the turnbuckle is that the cylindrical members 1 have a tendency to disengage from the parallel bars 3 at the welding lines 4 when the turnbuckle is subjected to a relatively big load. Therefore, a one piece seamless turnbuckle is disclosed in EP0,700,748 to overcome the problem.

Referring to EP0,700,748, the turnbuckle manufactured according to the method disclosed has overcome the problem and provided a better tensile strength. However, the manufacture of the turnbuckle is discovered to suffer a certain degree of difficulty relating to the fabrication of end portions.

There is a typical method for manufacturing a one piece turnbuckle that involves hot forging process. However, the forging usually requires expensive tooling and machines. Furthermore, the forging usually requires a bulky starting material, and the metal removal requirement is a necessity. Thus, the turnbuckle is heavy, expensive to manufacture, and material consuming.

The present invention is, therefore, intended to obviate or at least alleviate the problems encountered in the prior art.

SUMMARY OF THE INVENTION

In accordance with one aspect of the invention, there is provided a method for manufacturing a one piece turnbuckle. The method involves preparing a board of metal. The method further involves deep drawing the board to form two protrusions on a side thereof. By continual deep-drawing the board, the board is shaped into a form of a bar which has two opposite ends defined by the protrusions. The method further involves deep drawing the board to reduce the thickness of the board in a transverse direction and to form a recess between the protrusions. By continual deep-drawing the recess, the depth of the recess is increased. The method further involves punching the recess to form a through opening. The method further involves boring a hole through each of the protrusions. The method further involves tapping each hole to form a threaded section.

It is an objective of the present invention to provide a one piece turnbuckle so that the turnbuckle includes an excellent tensile strength.

It is another objective of the present invention to make the manufacture of a turnbuckle efficient.

It is yet another objective of the present invention to provide a turnbuckle that saves material.

In yet another objective of the present invention to provide a turnbuckle manufactured from a board of metal rather than a bulky one.

Other objectives, advantages, and novel features of the invention will become more apparent from the following detailed description when taken in conjunction with the accompanying drawings.

BRIEF DESCRIPTION OF THE DRAWINGS

For the present disclosure to be easily understood and readily practiced, the present disclosure will now be described for the purpose of illustration not limitation, in conjunction with the following figures, wherein.

DETAILED DESCRIPTION OF THE PREFERRED EMBODIMENT

Figure 1:
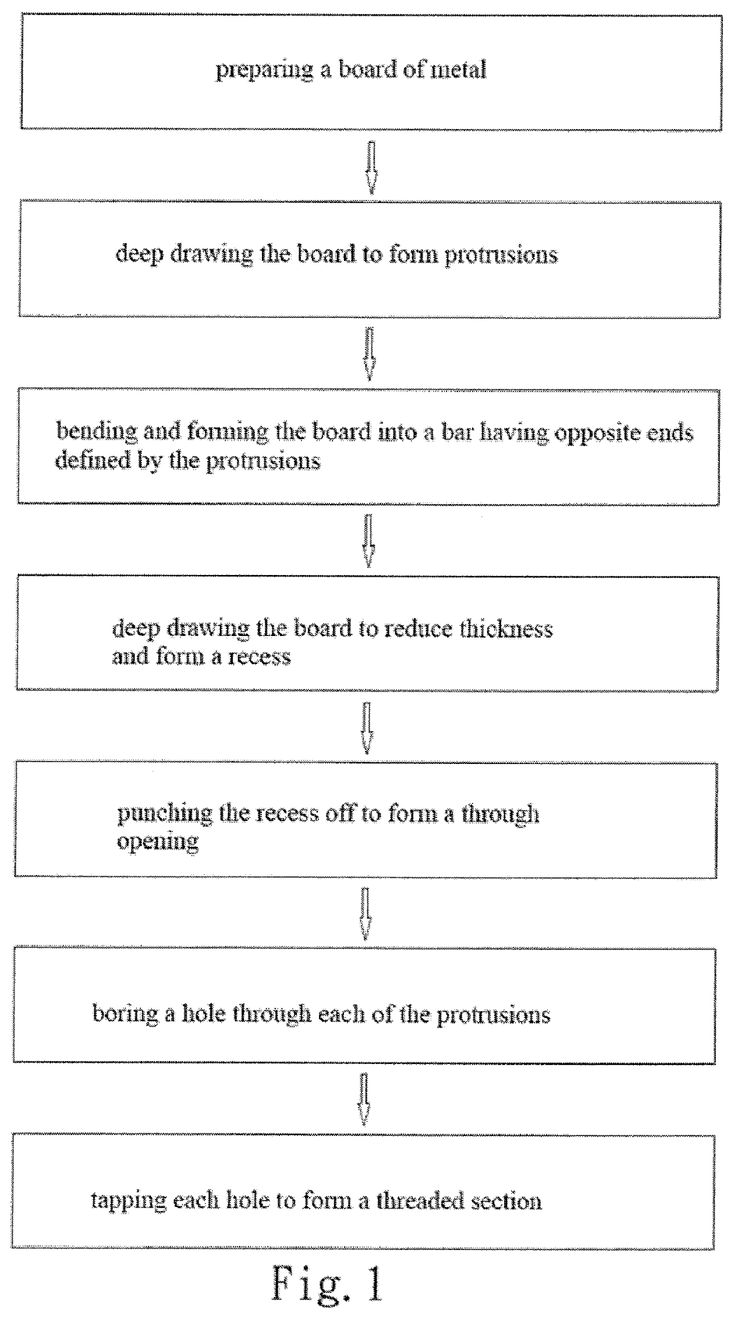
FIG. 1 is a flow chart representing a method of manufacturing a turnbuckle in accordance with the present invention.

Referring to FIG. 1, there is shown a flow chart representing a method for manufacturing a one piece turnbuckle 10. The method comprises the steps of preparing a board 20 of metal; deep drawing the board 20 to form two protrusions 30; bending and shaping the board 20 into a form of a bar which has two opposite ends defined by the protrusions 30; deep drawing the board 20 to reduce its thickness and to form a recess 40 between the protrusions 30; punching the recess 40 to form a through opening 50; boring a hole 60 through each of the protrusions 30; and tapping each hole 60 to form a threaded section 70. The steps may be carried out in a progressive die or in compound dies.

Figure 2:
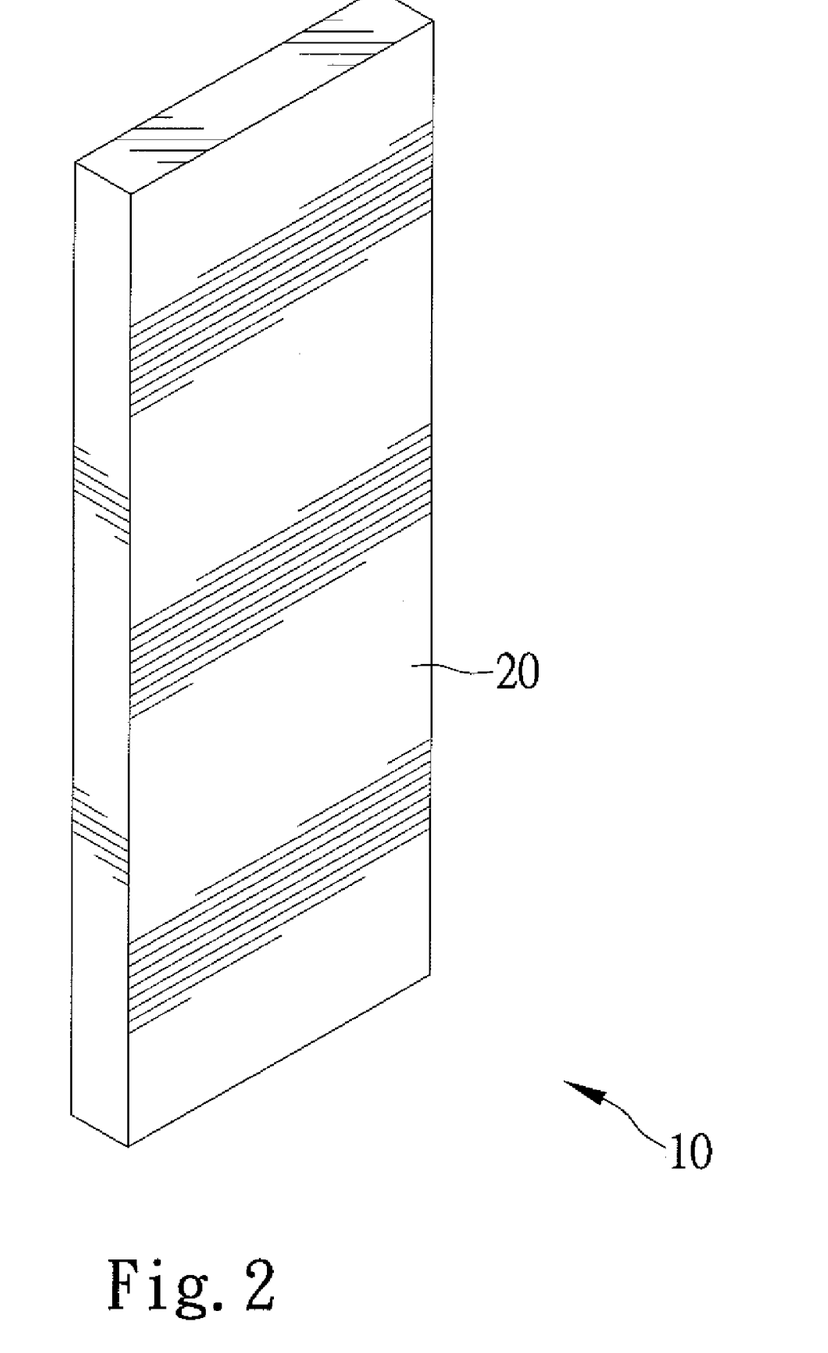
FIG. 2 is a perspective view of a board of metal for making the turnbuckle in accordance with the present invention.
Figure 3:
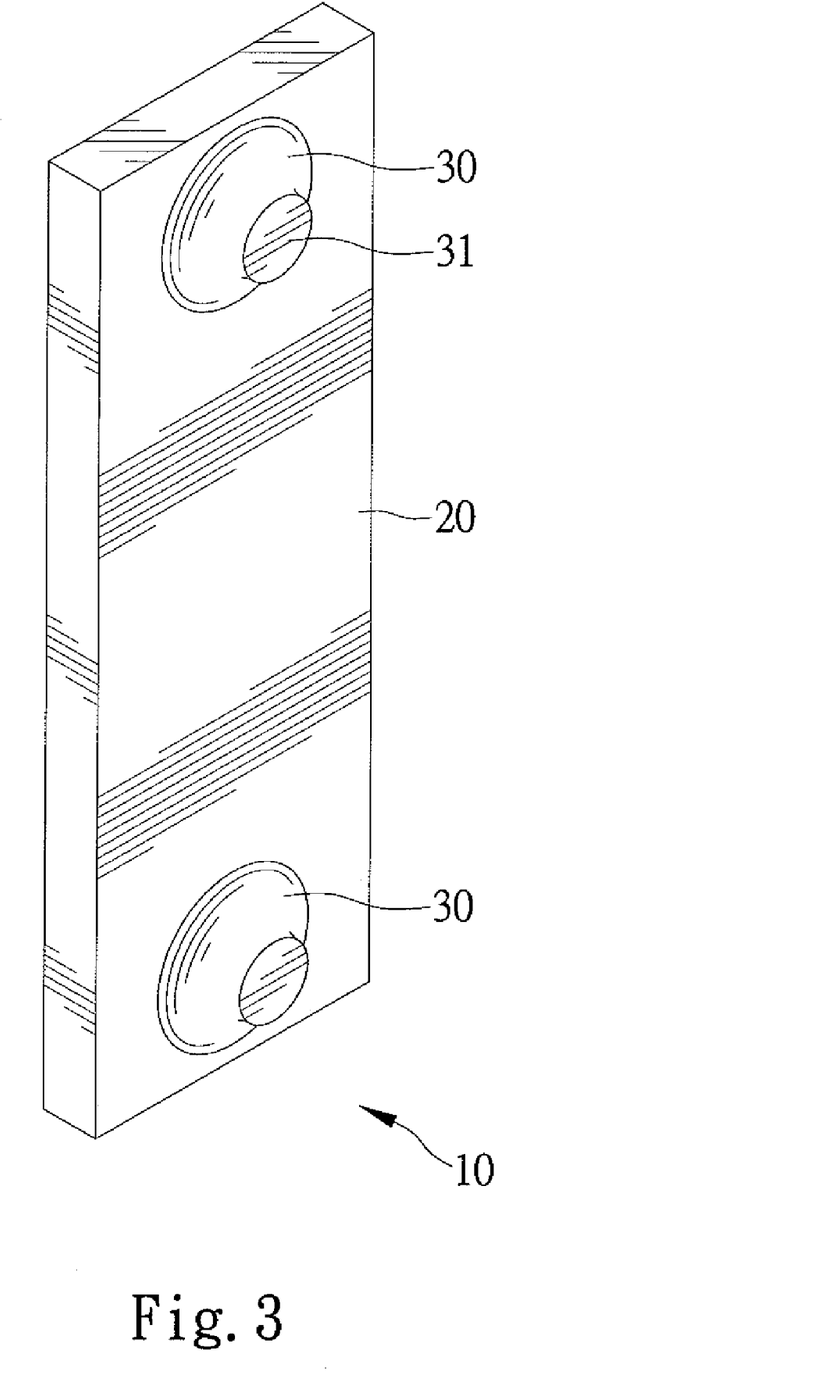
FIG. 3 shows a view illustrating a deep drawing step of the process of forming the turnbuckle of the present invention.
Figure 4:
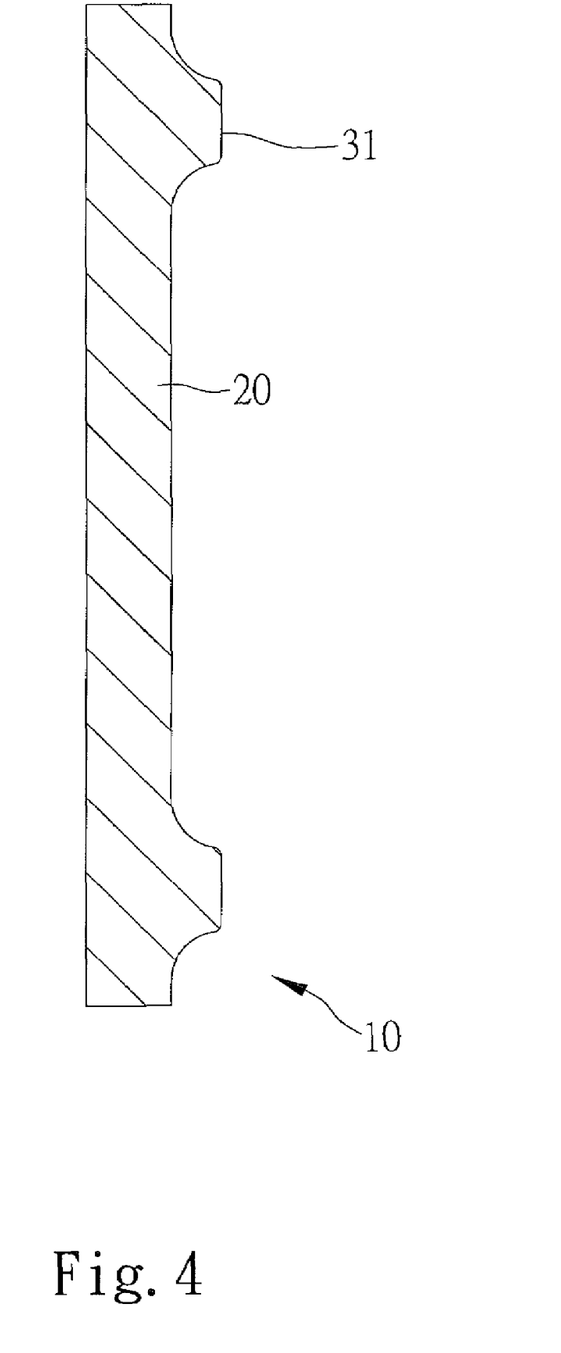
FIG. 4 shows a cross sectional view of the board after the deep drawing step of FIG. 3.
Figure 5:
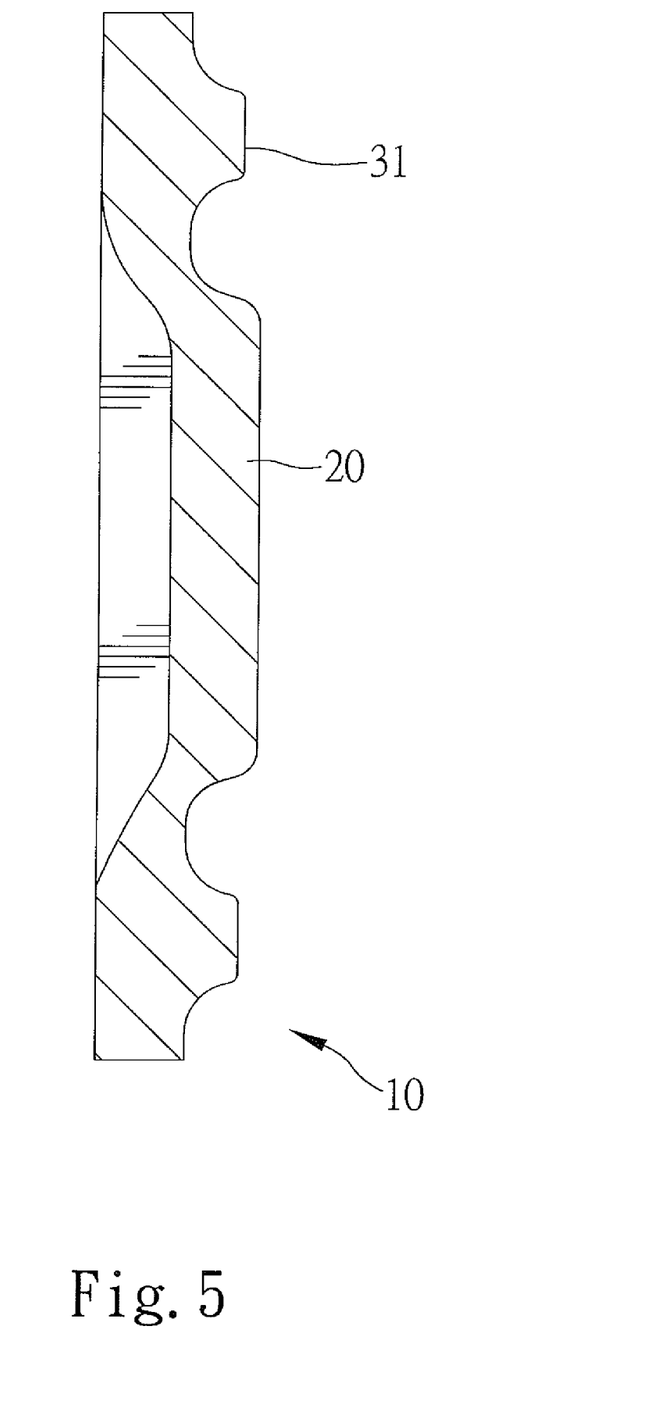
FIG. 5 shows a cross sectional view of the board illustrating a deep drawing step of the board of FIGS. 3 and 4 of the process of forming the turnbuckle of the present invention.
Figure 6:
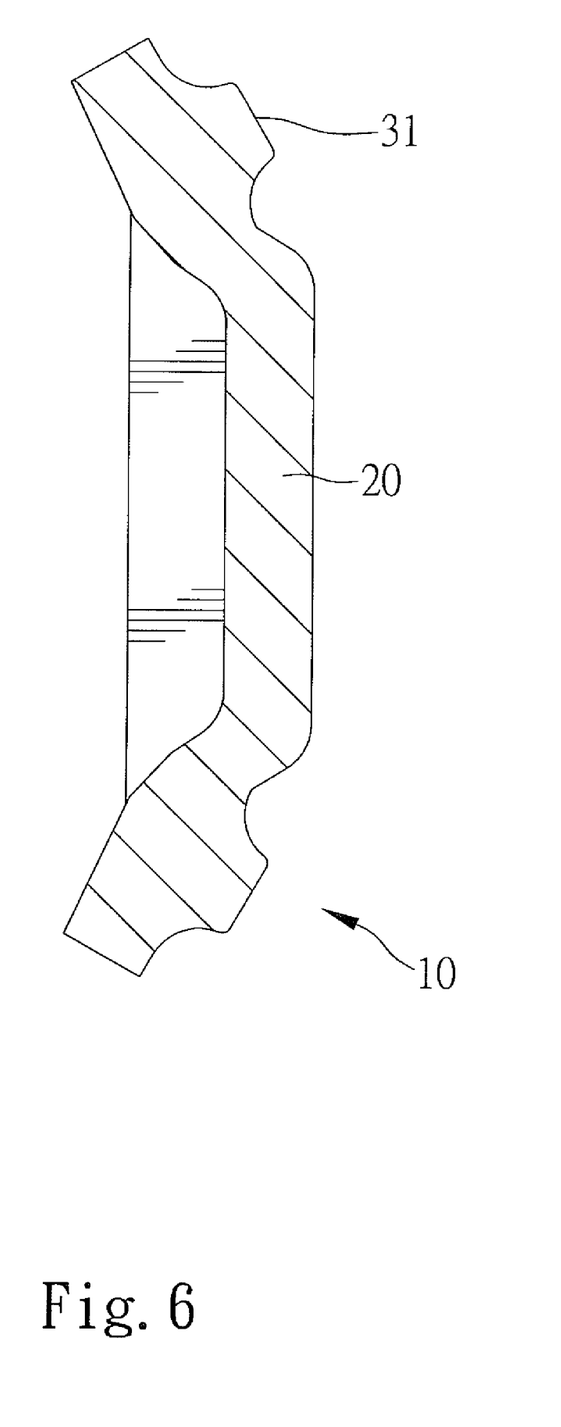
FIGS. 6 to 8 are views illustrating a bending and deep drawing step of board of FIG. 5 of the process of forming the turnbuckle of the present invention.
Figure 7:
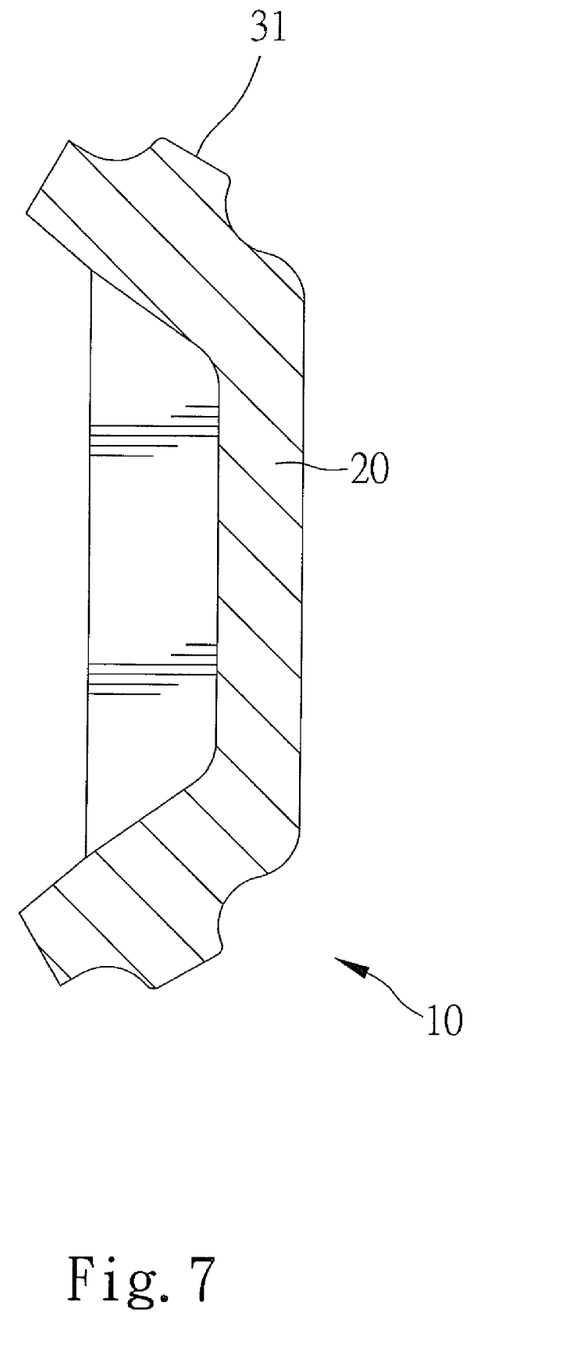
Figure 8:
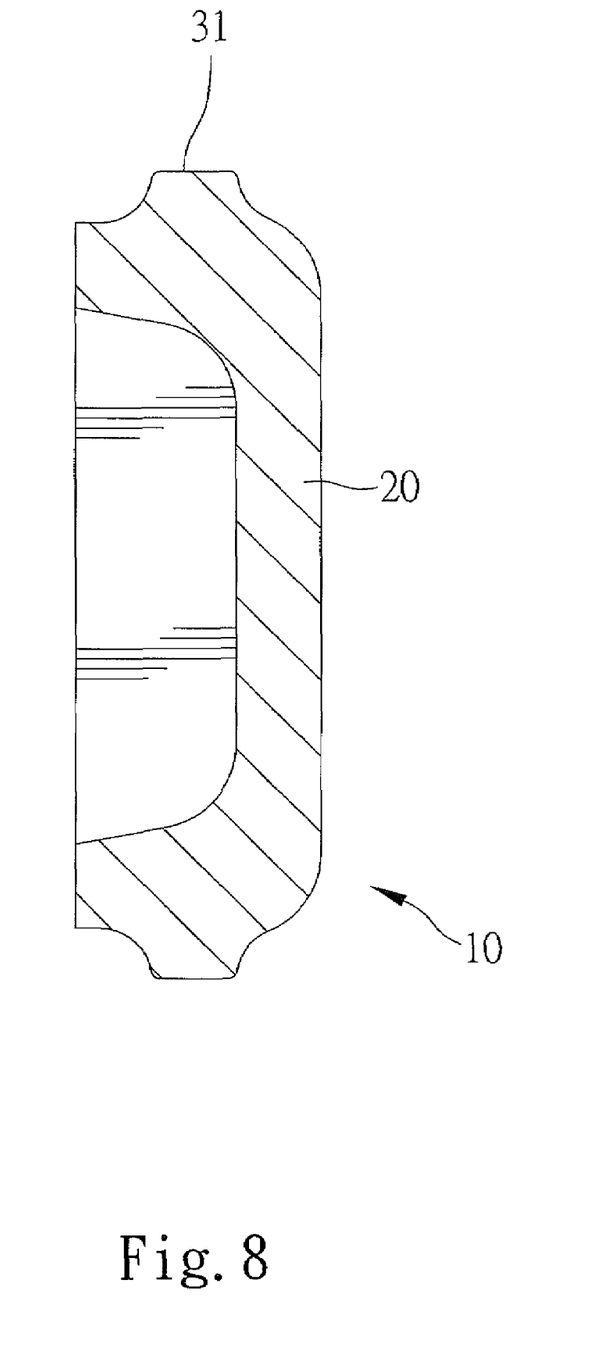
Figure 9:
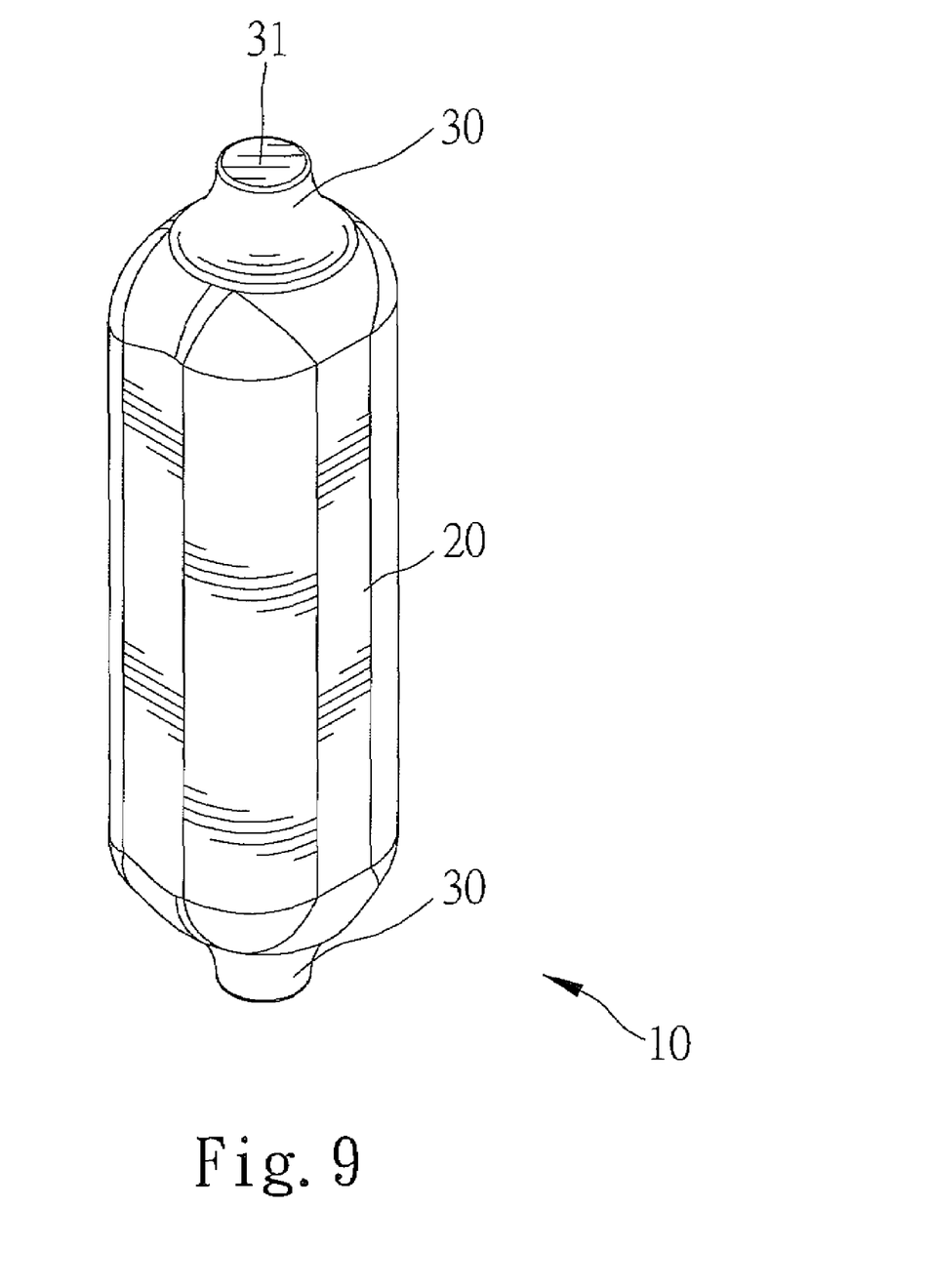
FIG. 9 shows a perspective view of the board illustrating a deep drawing step of the board of FIG. 8 of the process of forming the turnbuckle of the present invention.
Figure 10:
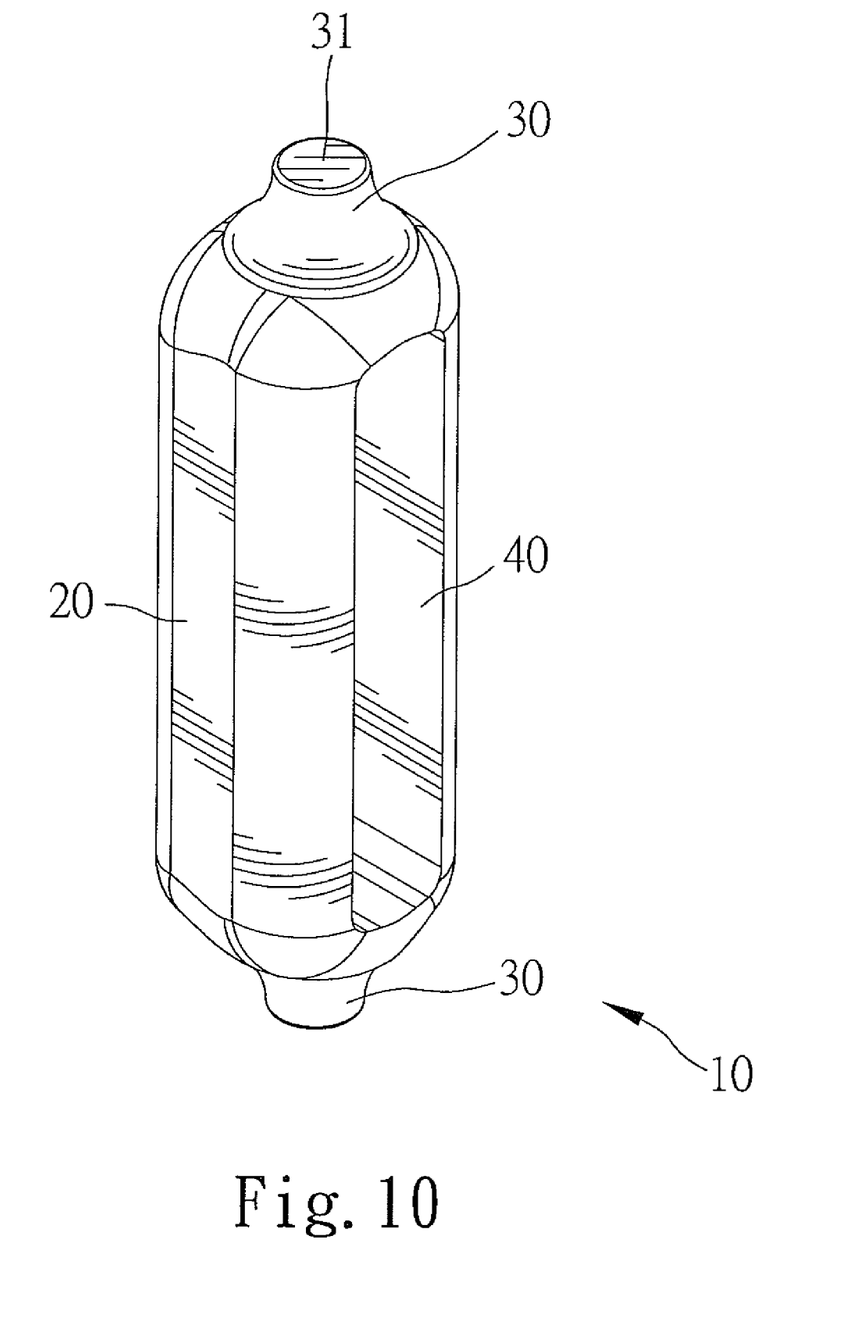
FIG. 10 shows an opposite perspective view of the board of FIG. 9.
Figure 11:
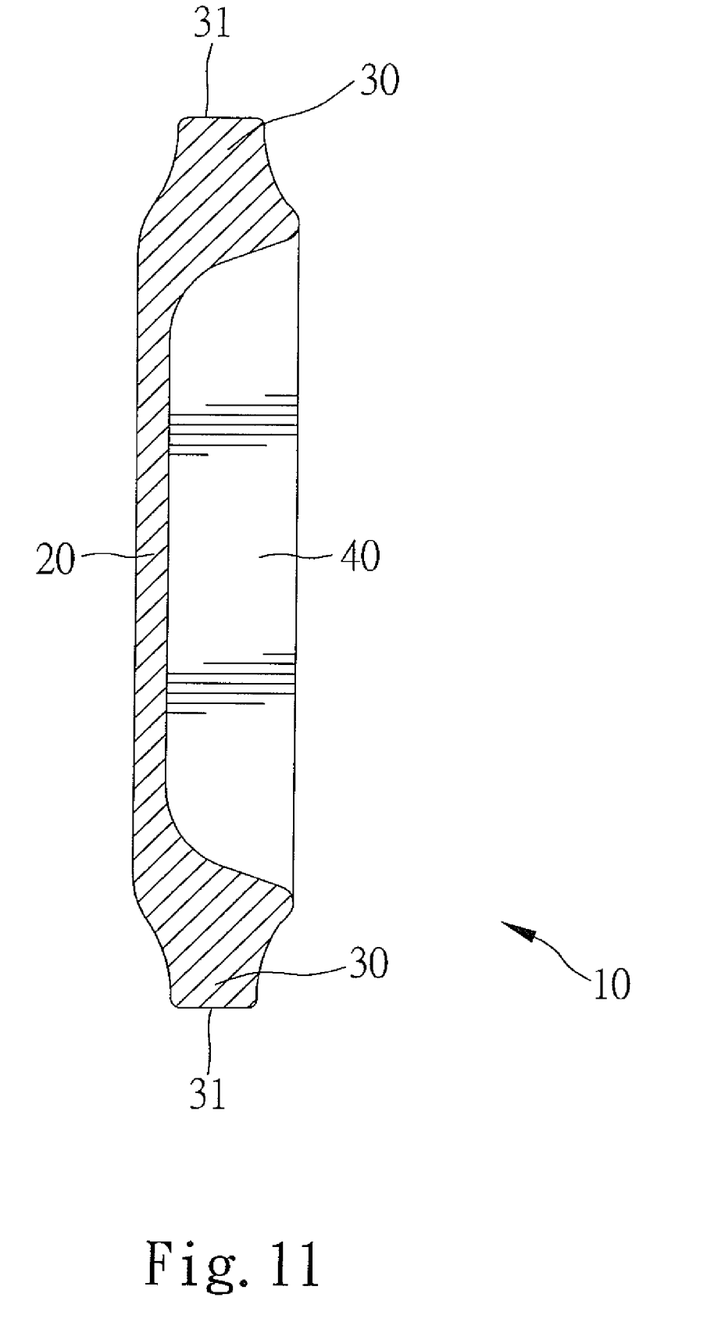
FIG. 11 is a cross-sectional view of the turnbuckle shown in FIG. 10.

FIG. 2 illustrates the broad 20 of metal provided for making the turnbuckle 10. The board 20 may be of metal or other materials capable of being deep drawn, as is desired. In FIG. 3, there is illustrated a deep drawing operation in which the board 20 is subjected to a deep drawing machine (not shown) to form the protrusions 30 on a side thereof. In FIGS. 5-8, there is illustrated a bending and deep drawing operation in which the board 20 is shaped into a form of a bar which has two opposite ends defined by the protrusions 30. In FIGS. 9-11, there is illustrated a deep drawing operation in which the board 20 is deep drawn to reduce its thickness in a transverse direction and to form the recess 40 between the protrusions 30. The depth of the recess 40 gradually increases throughout the deep-drawing operation. The protrusions 30 may be parallel to one another and include a planar surface 31 thereon.

Figure 12:
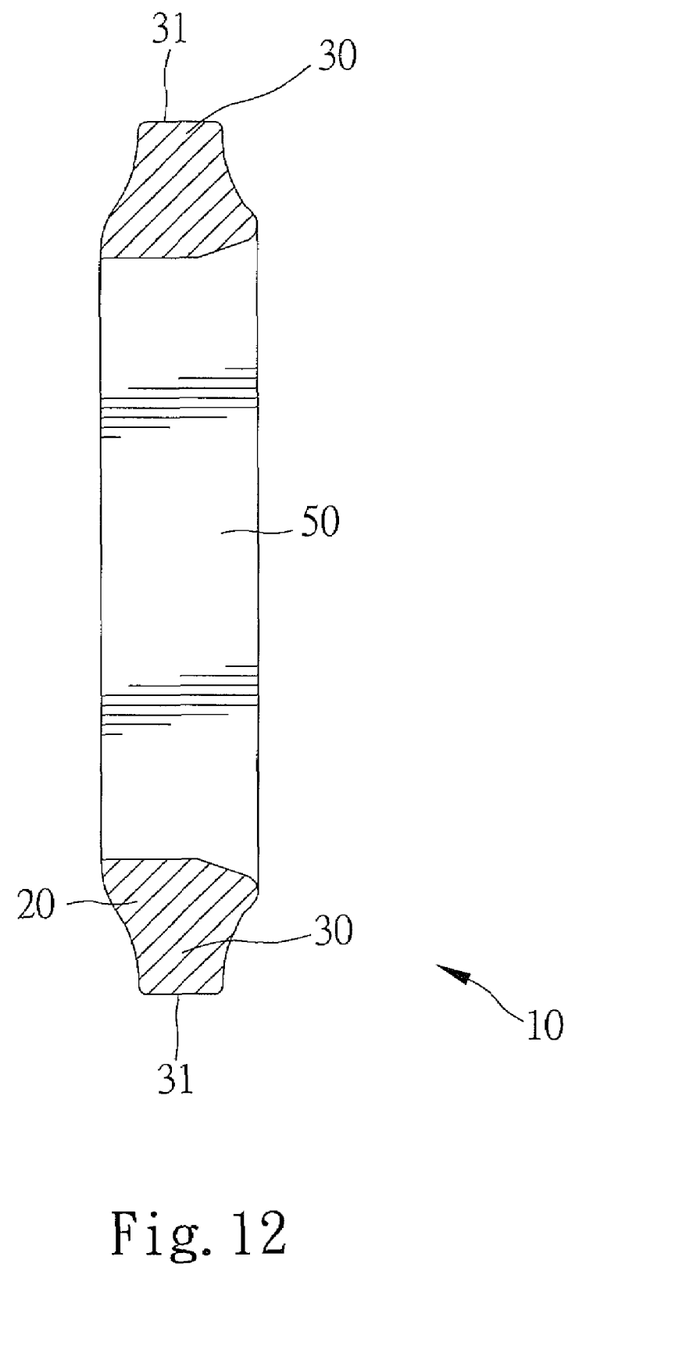
FIGS. 12 to 14 are cross-sectional views illustrating further process of forming the turnbuckle of the present invention, with the turnbuckle undergoing a boring step and a tapping step.
Figure 13:
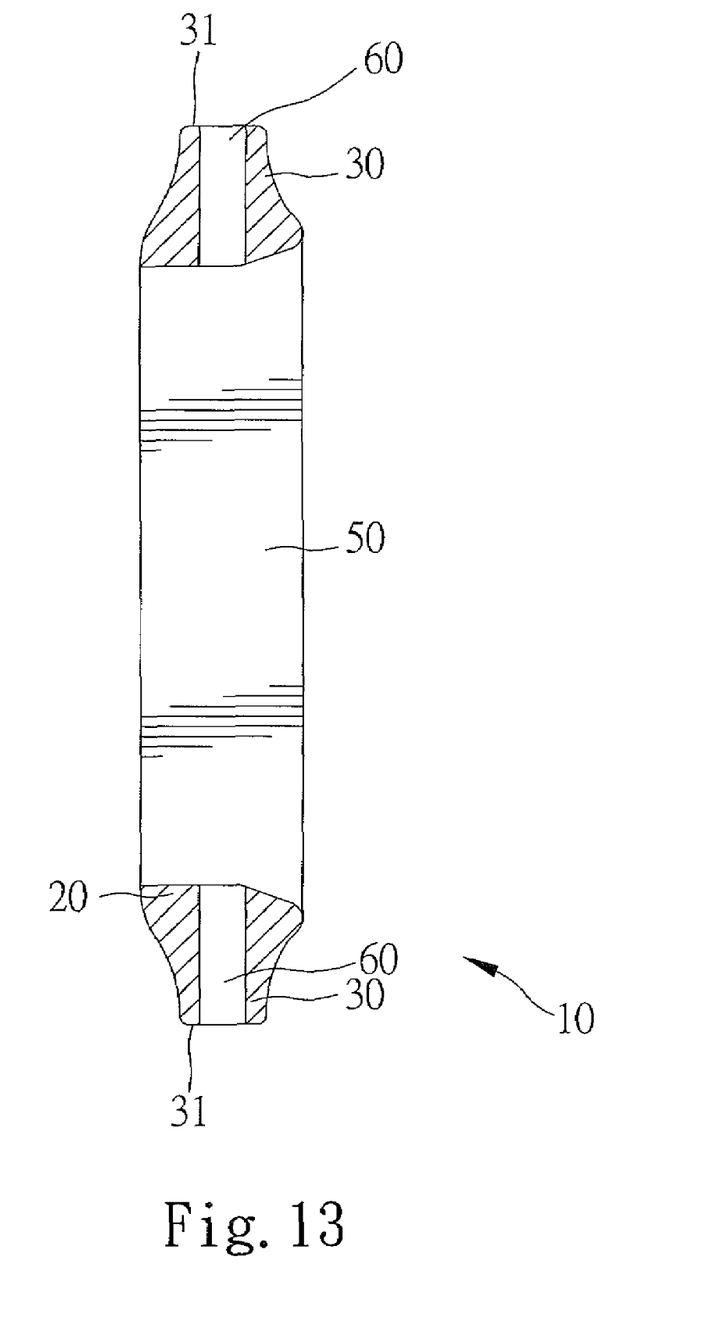
Figure 14:
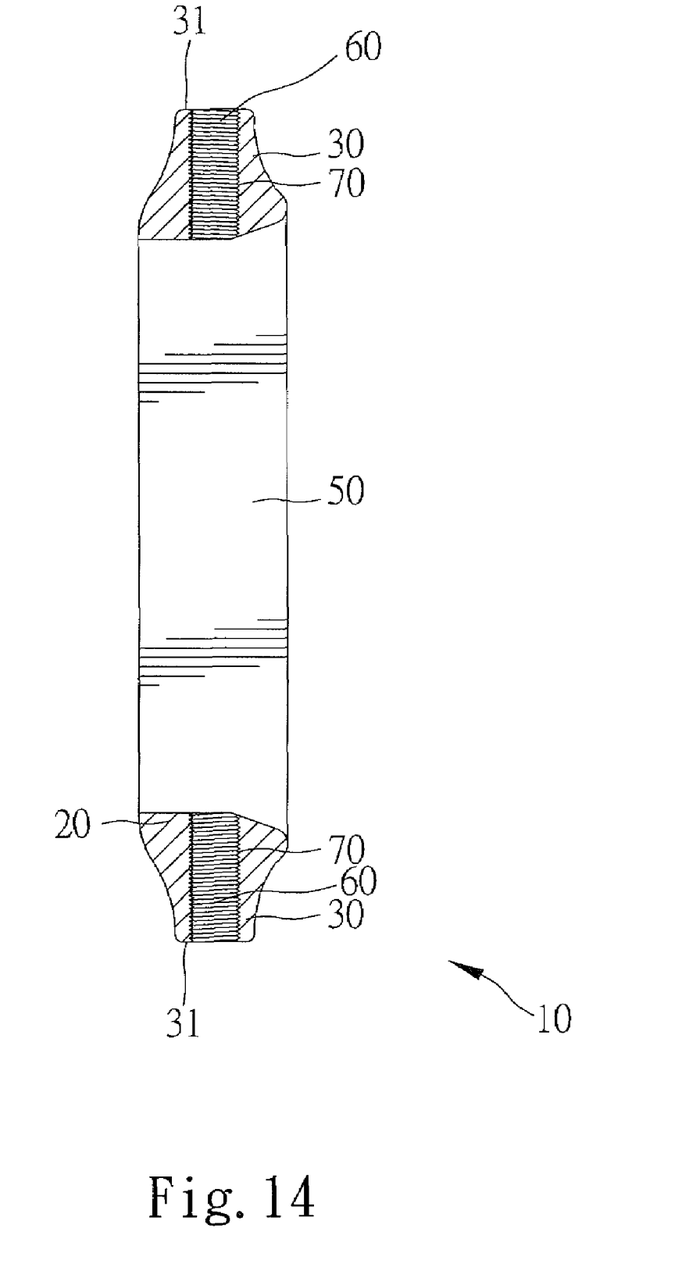
Figure 15:
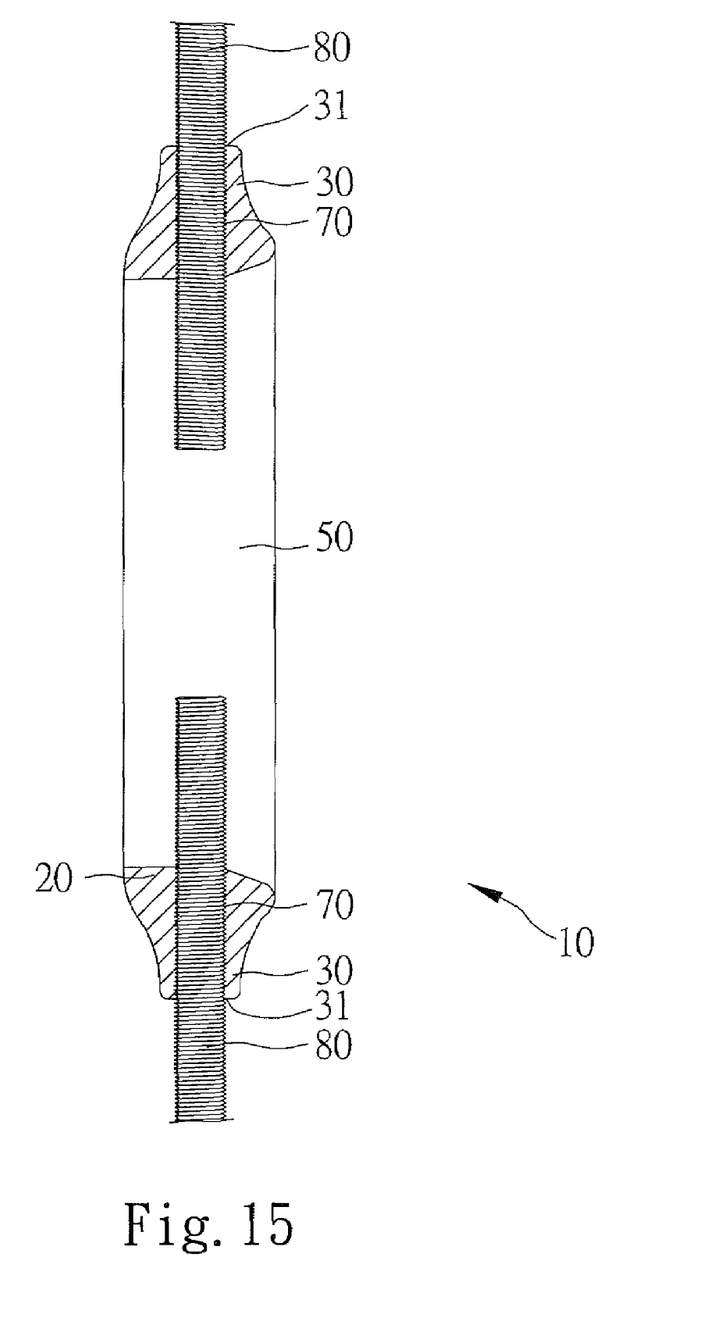
FIG. 15 is a cross-sectional view illustrating the application of the turnbuckle of the present invention.

In FIG. 12, there is illustrated a punching operation in which the recess 40 is punched off to form the through opening 50. In FIG. 13, there is illustrated a boring operation in which any type of machinery available is run into each of the protrusions 30 to form the hole 60. The holes 60 may be formed successively or simultaneously. In FIG. 14, there is illustrated a tapping operation in which the hole 60 is tapped to form the threaded section 70 for engaging with bolts 80 or with other structures which are intended to be retained by the turnbuckle 10. In addition, the sequence of the steps shown in FIG. 1 may be otherwise changed such that the process includes preparing a board of metal; deep drawing two protrusions from a side of said board; bending and forming said board into a shape which has two opposite ends defined by the protrusions; boring a hole through each of said protrusions; deep drawing said board to form a recess between said protrusions; punching the recess so as to form a through opening; and tapping each hole to form a threaded section. Also, the process may otherwise be changed such that the process includes preparing a board of metal; deep drawing two protrusions from a side of said board; bending and forming said board into a shape which has two opposite ends defined by the protrusions; boring a hole through each of said protrusions; tapping each hole to form a threaded section; deep drawing the board to form a recess between said protrusions; and punching said recess so as to form a through opening.

In one aspect of the turnbuckle 10 according to the present invention, the turnbuckle 10 is formed in one piece to provide an excellent tensile strength.

In another aspect of the turnbuckle 10 according to the present invention, the turnbuckle 10 is of efficient and economical manufacture, as the turnbuckle 10 is saved from a welding operation.

In yet another aspect of the turnbuckle 10 according to the present invention, the turnbuckle 10 is manufactured from a board of metal rather than a bulky one.

While the specific embodiments have been illustrated and described, numerous modifications come to mind without significantly departing from the spirit of invention and the scope of invention is only limited by the scope of accompanying claims.

What is claimed is:

1. A method for manufacturing comprising:
    preparing a board of metal including a first side and a second side opposite to the first side; thereafter
    deep drawing two protrusions from the first side of said board; thereafter
    bending and forming said board into a shape which has two opposite ends defined by the two protrusions; thereafter
    deep drawing said board to form a recess between said protrusions; thereafter
    punching said recess to form a through opening; thereafter
    boring a hole through each of said protrusions; and thereafter
    tapping each hole to form a threaded section, wherein a one piece turnbuckle is formed.

2. A method as claimed in claim 1 when deep drawing the board to form the recess, the thickness of said board is reduced in a transverse direction, and the depth of the recess gradually increases throughout the deep drawing.

3. A method for manufacturing comprising:
    preparing a board of metal including a first side and a second side opposite to the first side; thereafter
    deep drawing two protrusions from the first side of said board; thereafter
    bending and forming said board into a shape which has two opposite ends defined by the two protrusions; thereafter
    boring a hole through each of said protrusions; thereafter
    deep drawing said board to form a recess between said protrusions; thereafter
    punching the recess to form a through opening; and thereafter
    tapping each hole to form a threaded section, wherein a one piece turnbuckle is formed.

4. A method as claimed in claim 3 when deep drawing the board to form the recess, the thickness of said board is reduced in a transverse direction, and the depth of the recess gradually increases throughout the deep drawing.

5. A method for manufacturing comprising:
    preparing a board of metal including a first side and a second side opposite to the first side; thereafter
    deep drawing two protrusions from the first side of said board; thereafter
    bending and forming said board into a shape which has two opposite ends defined by the two protrusions; thereafter
    boring a hole through each of said protrusions; thereafter
    tapping each hole to form a threaded section; thereafter
    deep drawing the board to form a recess between said protrusions; and thereafter
    punching said recess to form a through opening, wherein a one piece turnbuckle is formed.

6. A method as claimed in claim 5 when deep drawing the board to form the recess, the thickness of said board is reduced in a transverse direction, and the depth of the recess gradually increases throughout the deep drawing.

* * * * *